March 31, 1936.   R. L. SEABURY ET AL   2,035,988

CLUTCH THROW-OUT BEARING

Filed May 31, 1930

Inventor
Ralph L. Seabury
Louis W. Murray

By Spencer Hardman & Feb
thur Attorneys

Patented Mar. 31, 1936

2,035,988

UNITED STATES PATENT OFFICE 2,035,988

CLUTCH THROW-OUT BEARING

Ralph L. Seabury and Louis W. Murray, Anderson, Ind., assignors, by mesne assignments, to General Motors Corporation, Detroit, Mich., a corporation of Delaware Application May 31, 1930, Serial No. 458,592

7 Claims. (Cl. 308—242)

This invention relates to any thrust bearing such, for instance, as employed in motor vehicles and a method of making such bearing.

It is an object of this invention to provide a bearing of this type which has superior wearing qualities, a relatively low coefficient of friction so that the bearing will not heat, and one which is self-lubricating.

It is a further object of this invention to provide a bearing of this character which is made of a mixture of materials which are held together by a suitable binder and molded into the desired form, and in which the various materials which compose the bearing are uniformly mixed so that the finished articles are of uniform quality.

It is a further object of the invention to devise a method of mixing the materials from which the bearing is made in such a way as to secure a very intimate and uniform mixture of these materials and which is relatively inexpensive and easy to carry out.

Further objects and advantages of the present invention will be apparent from the following description, reference being had to the accompanying drawing wherein a preferred embodiment of one form of the present invention is clearly shown.

Figure 1:
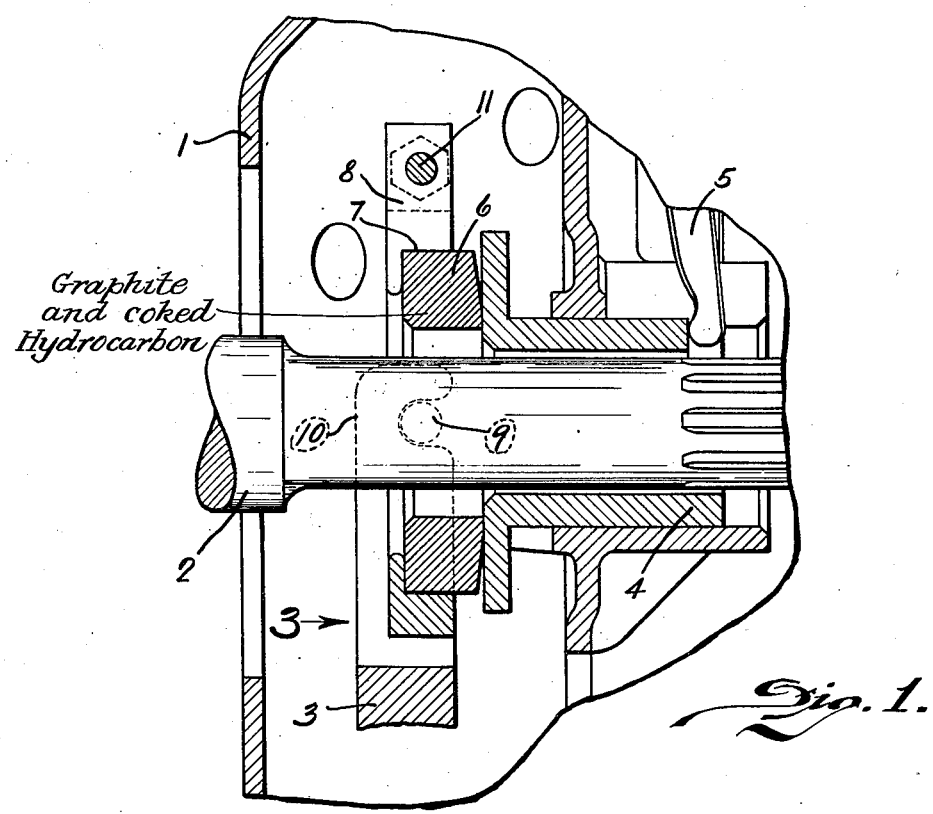
Fig. 1 is a fragmentary, sectional view of a conventional clutch such as used in automobiles showing a clutch throw-out bearing assembled.
Figures 2, 3:
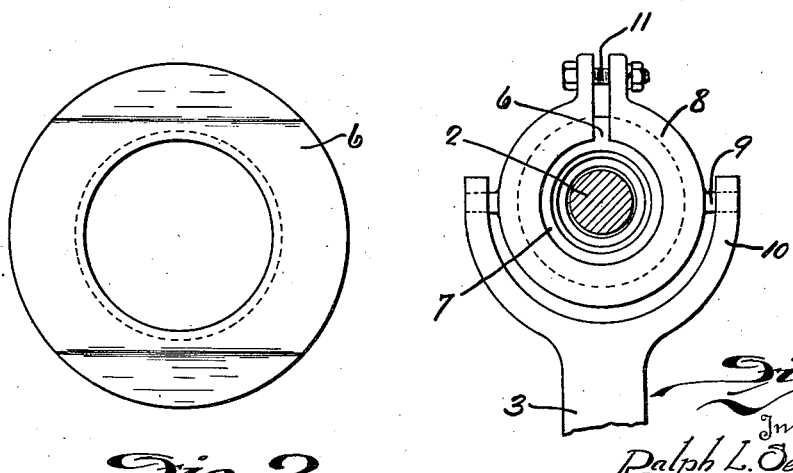
Figs. 2 and 3 are detail elevations.

While this invention relates only to the composition of the self-lubricating element which forms the bearing surface, such bearing has been illustrated in the drawing herein to show in general the form of the bearing and how it is used. Referring to Fig. 1 of the drawing, the reference numeral 1 indicates the housing for the clutch, while shaft 2 is the drive shaft which is coupled to the crank shaft of the engine for rotation therewith when the clutch is engaged. In order to effect engagement and disengagement of the clutch, lever 3 is operated from a foot pedal within the automobile in the usual manner to move the driven member into and out of engagement with the driving member of the clutch in the usual way. When the lever 3 is in the position shown in the drawing, the two clutch members are engaged, a sleeve 4, which is slidable on and rotatable with the shaft 2, and also movable with the driven member of the clutch, being in position to permit engagement of the clutch member. This sleeve is moved to the right in Fig. 1 on operation of the lever 3 to disengage the clutch member through the medium of the finger 5 in the usual way. On such movement of the sleeve a bearing element 6 in the form of a ring having an aperture therein somewhat larger than the shaft 2 and which is received in a recess 7 formed in a supporting collar 8, which is provided with trunnions 9 supported in a yoke 10 which constitutes the upper end of the lever 3. The collar 8 is split and by means of a bolt 11 the bearing element may be clamped therein. When the lever 3 is operated to release the clutch members the bearing element 6 is held in engagement with the sleeve 4 with considerable pressure and effective lubrication of this bearing element has been found difficult. According to the present invention, the member 6 is formed of a composition which substantially overcomes the difficulty which has been met in prior compositions employed in the manufacture of bearings of this type. Such compositions as heretofore employed have shown a tendency to heat, to wear out rapidly and to become noisy, all of which difficulties are largely eliminated by the use of a bearing member constructed in a manner hereinafter described.

According to one form of this invention, the member 6 is formed of a mixture of graphite and a binder in the form of a phenolic condensation product such as Bakelite. Various proportions of these ingredients have been found to be satisfactory, the proportions varying from 25 parts to 53 parts of Bakelite binder and from 75 parts to 47 parts of the graphite by weight. When the bearing member is made of graphite and Bakelite only, substantially satisfactory results are obtained by mixing the materials in the form of dry powder in the usual manner employed in the manufacture of brushes for electrical machines. If the materials are mixed dry, they are mixed in a suitable mixing machine and subsequent to the mixing operation are briquetted in a briquetting press under pressure of substantially 14,000 to 30,000 pounds to the square inch to form the bearing member in the desired shape. The briquettes are then cured in the Bakelite mold in the usual manner of curing the brushes, but subjected to a pressure of approximately 6,000 pounds and a temperature of substantially 300° F.

Good results are obtained by use of the bearing member without heating to a degree sufficient to coke the Bakelite, the graphite contained in the member acting as a lubricant. It may be found desirable, however, to coke the bearing member in order to form pores therein, the Bakelite being to some extent volatile at sufficiently high temperatures and giving off gases during the coking operation, which leaves the bearing member porous to some extent. The bearing member is soaked in lubricating oil which is gradually fed to the surface thereof during use by capillary action. If it is desired to coke the bearing member, it is heated in a suitable furnace for approximately 9 hours at a temperature of 900°. After the coking operation, the bearing member is soaked in lubricating oil for a length of time sufficient to completely fill the pores of such member with oil.

A somewhat superior article in which the graphite and binder are more intimately mixed may be formed if the materials are mixed wet. According to this process of mixing, the graphite is wet with water until a relatively thin paste is formed and to this is added a solution of Bakelite in an alkaline salt such as sodium hydroxide, calcium hydroxide, potassium hydroxide, sodium carbonate, or in fact almost any alkali except ammonium hydroxide, which does not give altogether satisfactory results. The amount of the salt which is necessary to dissolve the Bakelite will vary somewhat depending on the alkali used, but if sodium hydroxide is employed, about 1 gram is used in solution to every 5 grams of Bakelite, and the solution employed may vary from 3 to 10 per cent in strength, a 5 per cent solution giving entirely satisfactory results. The Bakelite is entirely dissolved and the solution is thoroughly mixed with the graphite paste.

After this mixing operation, sufficient acid is added to neutralize the mixture, the acid being added slowly in any desirable manner and the Bakelite is precipitated from the solution in the form of a light, fluffy curd, which coats the graphite, the alkali and acid reacting to form water and a salt in solution. The mixture is then filtered and washed to take out the salt and the residue of graphite coated with Bakelite is dried. This may be accomplished either by spreading the material out in a thin layer and drying in the air at normal temperatures, or it may be dried in a shorter time by employing a suitable drying oven so long as the temperature therein be maintained at not to exceed 200° F.

The dried material, obtained as above described, is then ground up in any suitable machine to form a relatively fine powder, which is briquetted in a suitable press as previously described. These briquettes are dried in exactly the same manner as described above in connection with those formed from powdered materials which are mixed dry.

The advantages of mixing wet graphite with the Bakelite while the latter is suspended in solution, are several. First, graphite is somewhat porous and if dry graphite were mixed with a solution containing Bakelite, the Bakelite would enter the pores of the graphite to some extent so that the binding action would be inferior and more Bakelite would be necessary than when mixed wet because when wet the pores of the graphite are always filled with water and the absorption of the Bakelite therein could not take place. Further, when the mixture of Bakelite is effected by the use of Bakelite in solution, a much more intimate mixture can be effected than when the materials are mixed dry, also the mixture throughout the mass of the material is more uniform and articles made from the mixture run more uniform in quality than when formed from a mixture of materials which were mixed in a dry state.

According to another form of the invention, the bearing member is made of a mixture of graphite, Bakelite and asbestos, the asbestos probably adding somewhat to the strength of the member. Various proportions of the materials have been found to form a satisfactory bearing element. The proportions which have been found to give satisfactory results are asbestos 40 to 52 parts, graphite 41 to 27 parts and Bakelite 19 parts by weight. When asbestos is employed in the manufacture of a bearing element, the asbestos is wet with a large quantity of water, substantially 20 parts water to 1 part of asbestos, and the graphite is added thereto and mixed therewith, while the Bakelite, which is dissolved in an alkaline solution in the manner previously described, is then added to the mixture with asbestos and graphite. The Bakelite solution might be first mixed with graphite and the mixture added to the wet asbestos, but in order to secure a homogeneous mixture of the materials, it would be necessary to first wet the graphite before the Bakelite solution was added thereto because of the absorption of the Bakelite by the graphite when dry, as above referred to. After mixing the asbestos, graphite and the Bakelite in either of the ways above mentioned, sufficient acid is added to neutralize the alkali and the Bakelite is precipitated as above described, after which the precipitate is washed, dried and pulverized in the manner previously set forth. The powdered material obtained in this manner is then briquetted as above described, cured in a Bakelite mold and if desired, may be coked to permit absorption of oil.

A bearing member made from the materials and according to the methods described in this application provides a most excellent bearing surface which does not heat, has excellent wearing qualities, and is substantially self-lubricating.

It will be understood that when only graphite and Bakelite are employed in forming the bearing member described, very good results may be obtained when the materials are mixed dry and although a somewhat more uniform mixture is obtained by the wet method of mixing, it is not essential that the materials be mixed in that manner. On the other hand, when asbestos is employed in the bearing member and it is attempted to mix the materials dry, the member formed is of a very inferior quality by comparison to a member formed from materials mixed according to the wet method.

It will be understood that if a relatively large proportion of the bearing element be in the form of a binder, such element will be somewhat stronger and harder than when less binder is employed. However, the self-lubricating qualities of the bearing element will be correspondingly reduced.

While the form of embodiment of the present invention as herein disclosed, constitutes a preferred form, it is to be understood that other forms might be adopted, all coming within the scope of the claims which follow.

What is claimed is as follows:

1. A self-lubricating bearing element comprising graphite and Bakelite coke impregnated with a lubricant.

2. A self-lubricating bearing element comprising graphite, asbestos and Bakelite coke impregnated with a lubricant.

3. A bearing having a wearing surface comprising an element formed of graphite and Bakelite coke.

4. A bearing having a wearing surface comprising an element formed of graphite and asbestos held together by a coked binder.

5. A bearing having a wearing surface comprising an element formed of graphite and asbestos held together by a coked hydrocarbon binder.

6. A bearing having a wearing surface comprising an element formed of graphite, asbestos, and Bakelite coke.

7. A bearing having a wearing surface comprising an element formed of graphite and a coked synthetic resin.

RALPH L. SEABURY.
LOUIS W. MURRAY.